United States Patent
Takahashi et al.

(10) Patent No.: US 6,226,508 B1
(45) Date of Patent: May 1, 2001

(54) TRANSMISSION DIVERSITY APPARATUS

(75) Inventors: Hideyuki Takahashi, Hachiouji; Katsuhiko Hiramatsu, Yokosuka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/104,180

(22) Filed: Jun. 25, 1998

(30) Foreign Application Priority Data

Jul. 4, 1997 (JP) .................................................. 9-194968

(51) Int. Cl.[7] .................................................. H04J 13/04
(52) U.S. Cl. ..................................... 455/277.1; 455/277.2; 455/279.1; 455/101; 375/267
(58) Field of Search .............................. 455/277.1, 277.2, 455/279.1, 69, 68, 133, 134, 135, 101; 375/267

(56) References Cited

U.S. PATENT DOCUMENTS

| | | | |
|---|---|---|---|
| 5,568,523 | * 10/1996 | Tsujimoto | 375/347 |
| 5,584,057 | * 12/1996 | Dent | 455/101 |
| 5,598,404 | * 1/1997 | Hayashi et al. | 370/342 |
| 5,652,764 | * 7/1997 | Kanzaki et al. | 375/200 |
| 5,787,122 | * 7/1998 | Suzuki | 375/267 |
| 5,883,921 | * 3/1999 | Andren et al. | 375/208 |

FOREIGN PATENT DOCUMENTS

| | | |
|---|---|---|
| 5-29990 | 2/1993 | (JP) . |
| 8-32498 | 2/1996 | (JP) . |
| 9-18396 | 1/1997 | (JP) . |

OTHER PUBLICATIONS

English Language Abstract of JP No. 5–299990.
English Language Abstract of JP No. 8–32498.
English Language Abstract of JP No. 9–18396.

* cited by examiner

*Primary Examiner*—Daniel S Hunter
*Assistant Examiner*—Alan T. Gantl
(74) *Attorney, Agent, or Firm*—Greenblum & Bernstein, P.L.C.

(57) ABSTRACT

Outputs of A/D converters 110, 111, and 112 are input to correlation devices 117, 118, and 119. The correlation devices 117, 118, and 119 output ratios of these signals to an output signal of a modulator 116 for modulating an output of a switching device 115. Each of standardizing devices 120, 121, and 122 cancels a gain component from an input signal, and selects a signal having a maximum signal-to-interference power ratio. A switching device 124 switches a transmitting antenna in accordance with the selection result so as to send a transmitting message. A switching device 125 switches a unique word in a synchronous burst, and a unique word in a communication channel signal, or a receiving message to be sent to the correlation devices as a reference signal.

14 Claims, 9 Drawing Sheets

TRANSMISSION DIVERSITY APPARATUS

BACKGROUND OF THE INVENTION

1. Field of the Invention

The present invention relates to a transmission diversity apparatus.

2. Description of the Related Art

The conventional transmission diversity apparatus is structured as follows:

FIG. 1 is a block diagram showing one example of the conventional diversity apparatus.

Carrier frequency radio signals received from antennas #1 and #2 are converted to base band signals by receiving RF sections 1 and 2. Level detectors 3 and 4 detect field strength of each base band signal for a fixed period of time, and send the detected value to mean value calculators 5 and 6, respectively. The mean value calculators 5 and 6 calculate the mean value of the detected values. A corrector 7 obtains an output difference of the mean value calculators 5 and 6, and adjusts the characteristics of these level detectors 3 and 4 based on the obtained output difference.

A comparator 8 compares the receiving level of the level detector 3 with that of the level detector 4, determines which receiving level is higher, and outputs the result to a switching device 9. The switching device 9 switches the transmission antenna in accordance with the output of the comparator 8.

A transmitting signal is input from a terminal 10, modulated by a modulator 11, and converted to a carrier frequency radio signal by a transmitting RF section. Thereafter, the radio signal passes through a receiving/transmitting separator 13 and is transmitted from either one of antennas #1 and #2 switched by the switching device 9.

Thus, the convention transmission diversity apparatus selects the antenna having the highest signal receiving level from the plurality of antennas, thereby transmitting the signal. As a result, irregularity of the characteristics of the receiving level measuring system is automatically corrected, so that transmission diversity is effectively performed.

The conventional diversity apparatus, however, selects the transmission antenna based on only the levels of the receiving signals. The receiving signals include a desired and an interfering signal. Due to this, even in a case in which the signal level of an interference station is: high, there causes a disadvantage in which such an antenna may be selected as an appropriate transmitting antenna.

SUMMARY OF THE INVENTION

An object of the present invention is to provide a transmission diversity apparatus, which ca perform appropriate transmission diversity by selecting an antenna whose desired signal power becomes the highest even in a case in which an interference station exists.

In order to achieve the above object, there is provided a transmission diversity apparatus comprising a plurality of antennas, each having gain controlling means for controlling receiving signal power; correlation processing means for processing the correlation between an output of the gain controlling means and a reference signal; and standardizing means for standardizing an output of the correlation processing means with a gain control amount of the gain controlling means, the transmission diversity apparatus selecting an antenna, which can obtain an output having a maximum desired signal power among outputs of the standardizing means, as a transmission antenna.

DETAILED DESCRIPTION OF THE PREFERRED EMBODIMENTS

Figure 1:
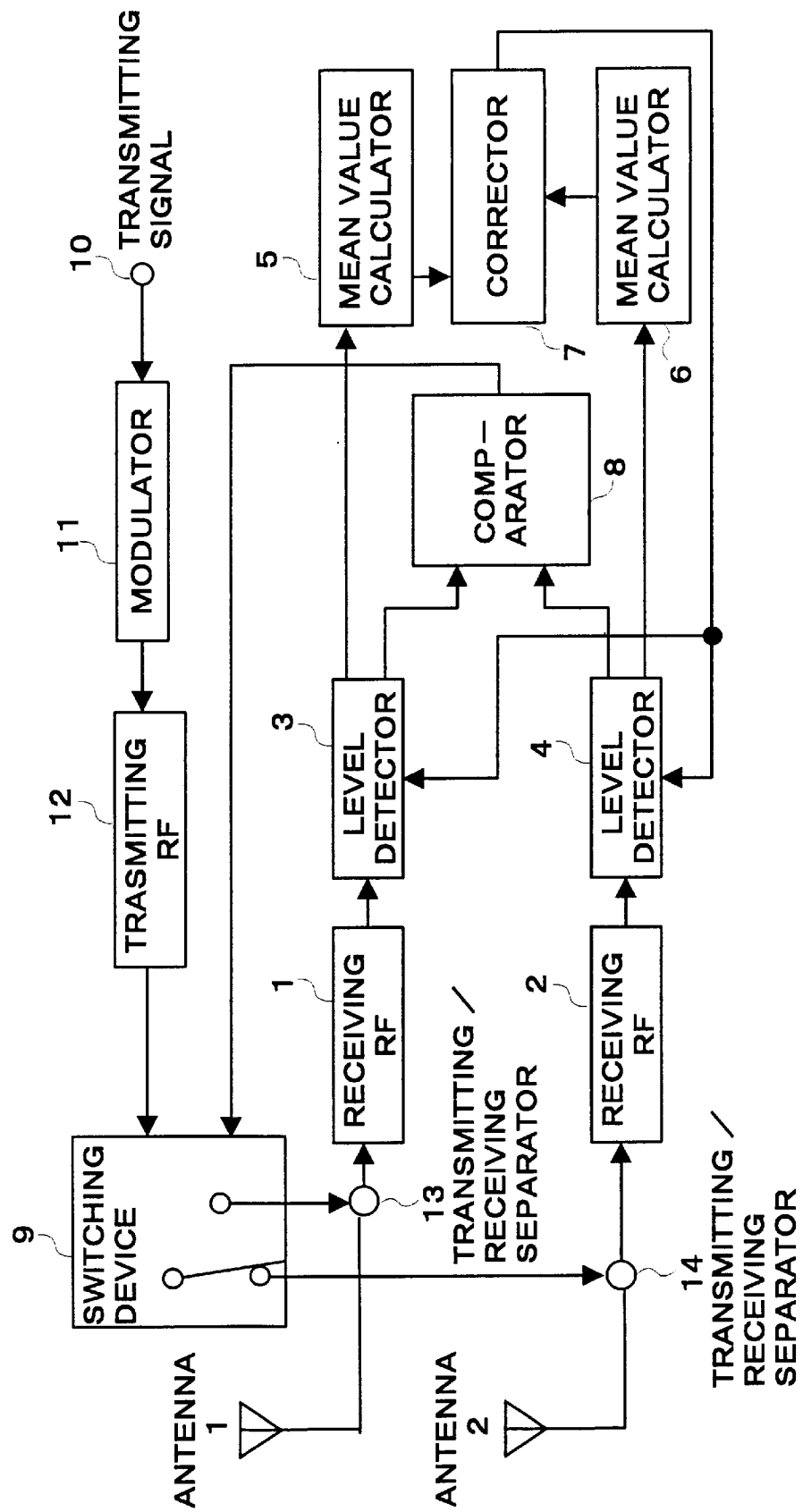
FIG. 1 is a block diagram showing a conventional transmission diversity apparatus.

The transmission diversity apparatus of the present invention has the following structure.

Specifically, there are provided gain controlling means for controlling receiving signal power, correlation processing means for processing the correlation between an output of the gain controlling means and a reference signal, and standardizing means for standardizing an output of the correlation processing means with a gain control value of the gain controlling means are provided in each of antennas. Then, an antenna, which can obtain an output in which a desired signal power is the highest of the outputs of the standardizing means, is selected as a transmission antenna.

In the embodiments of the present invention the following transmission diversity method i used.

Specifically, the correlation between each o the receiving signals of the antennas and reference signal is processed. Then, an antenna having the highest correlation is selected as transmission antenna, and the selected antenna is used to transmit a transmitting signal.

By the above-mentioned structure, there can selected the antenna in which a receiving signal having the high correlation with a predetermined reference signal can be obtained. In this case, an antenna, which can obtain an output in which a desired signal power is the highest of the outputs of the standardizing means, can be selected as a transmission antenna in consideration of a control gain value. As a result, even in a case where an interference station exists, there can be suitably performed transmission diversity using an antenna good for combating with an interfering signal and fading.

In the embodiments of the present invention, the reference signal may be used as a unique word signal in a synchronous burst or as a unique word signal in a communication channel signal. Thus, the use of the unique words in both the synchronous burst as a known symbol and the communication channel can allow an appropriate diversity effect to be obtained.

Also, in the above-mentioned structure, th reference signal may be used as a unique word signa in the synchronous burst and as a message signal i the communication channel signal. Moreover, when a unique word signal pattern of a desired station is different from that of an interference station the unique word signal is used as a reference signa: On other hand, when the unique word signal pattern of the desired station is the same as that of the interference station, the message signal in the receiving signal is used as a reference signal.

By the above-explained structure, the message signal can be used as a reference signal without referring to the unique word in the communication system in which the unique word signals of the communication channel signals are the same. Even in such a case, the transmission diversity effect can be appropriately obtained.

In the transmission diversity method, the unique word signal in the synchronous burst and the unique word signal in the communication channel signal are used as the reference signal. Or, the unique word in the synchronous burst or the message signal in the communication channel is used as the reference signal. According to such structure, the reference signal is suitably switched, so that the appropriate transmission diversity can be performed.

Embodiments of the present invention will now be specifically described with reference to the accompanying drawings.

(First Embodiment)

Figure 2:
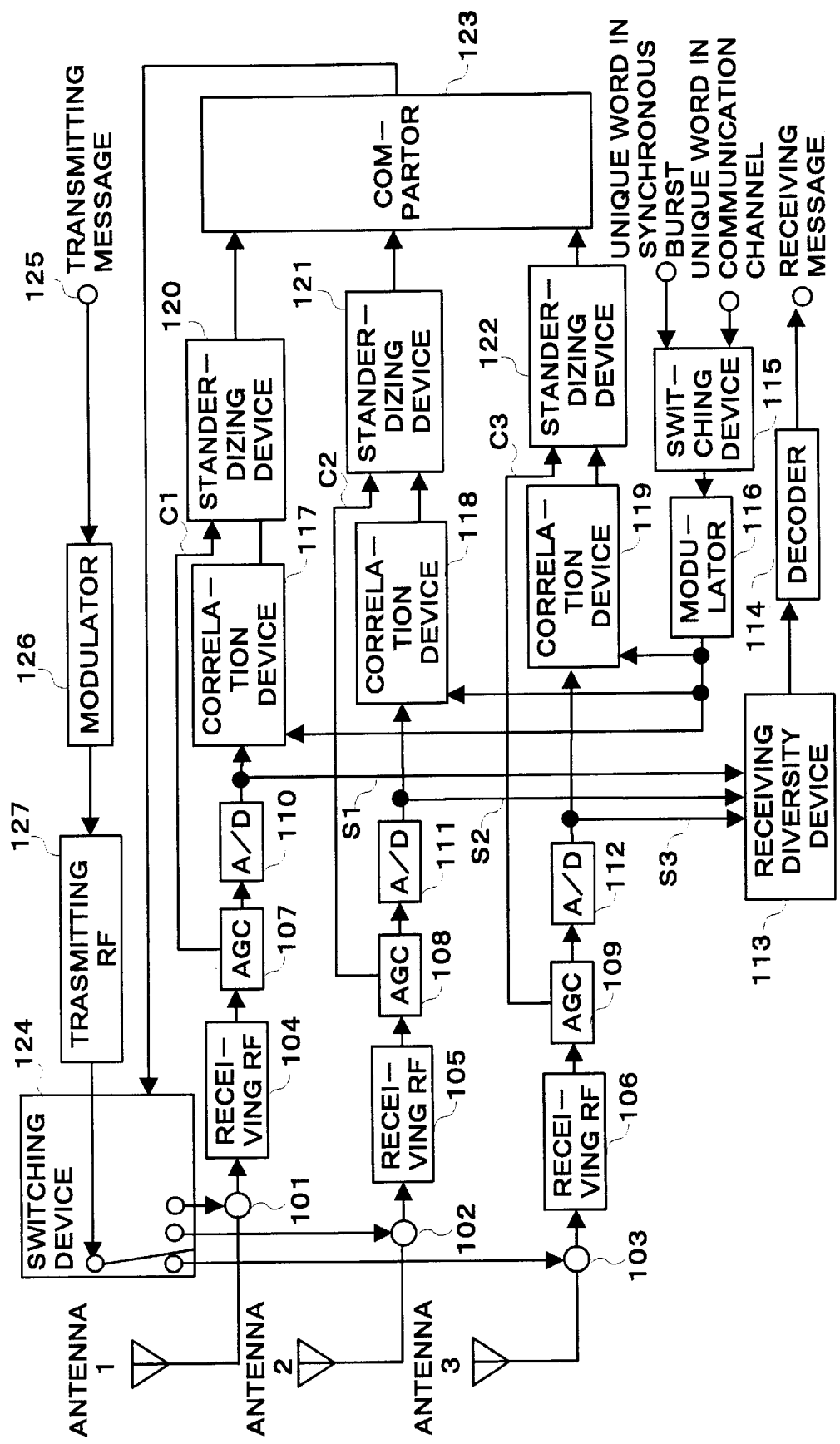
FIG. 2 is a block diagram. of a first embodiment according to a diversity apparatus of the present invention.

FIG. 2 is a block diagram showing the structure of the transmission diversity apparatus of the present invention. To simplify the explanation, the following will explain a case in which the number of antennas is three. However, even if the number of antennas is m, the basic operation is the same as the case in which the three antennas is used.

The apparatus receives carrier frequency signals from antennas #1, #2, and #3. The received signals are separated by receiving/transmitting separators 101, 102, 103 of each antenna, and sent to receiving RF sections 104, 105, and 106, respectively. Then, the carrier frequency signals are converted to base band signals by the receiving RF sections 104, 105, and 106, respectively. Moreover, AGC circuits 107, 108, and 109 control power levels of the base band signals, respectively. Next, A/D converters 110, 111, and 112 convert the respective base band signals to digital signals respectively. Digital signals S1, S2, and S3 are input to a receiving diversity device 113, an decoded by a decoder 114. Thereby, a receiving message can be obtained.

On the other hand, a switching device 115 switches the unique word in the synchronous burst, which is a known symbol as a reference signal, and the unique word in a communication channel signal, to be sent to a modulator 116. The modulator 116 modulates these unique words again, and inputs the modulated unique words to correlation devices 117, 118, and 119.

Figure 3:
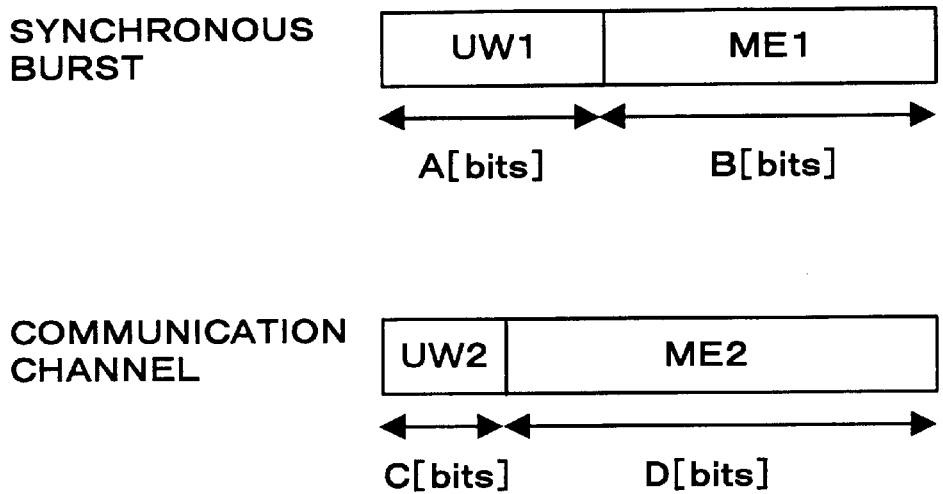
FIG. 3 is a view showing a frame format of receiving signal according to the first embodiment of the present invention.

FIG. 3 shows a frame format of a transmitting signal based on a method for receiving a communication channel signal, which is a message burst, after receiving a synchronous burst at a communication start time.

The synchronous burst includes a unique word (UW1) of A bit and a control signal (ME) of B bit. The communication channel signal includes a unique word (UW2) of C bit and a message signal (ME2) of D bit. The unique word (UW1) in the synchronous burst and the unique word (UW2) in the communication channel signal are different from each other in the symbol length and the signal pattern. If both are used as a reference signal without discrimination, a signal of a desired station cannot be extracted from the receiving signal.

Figure 4:
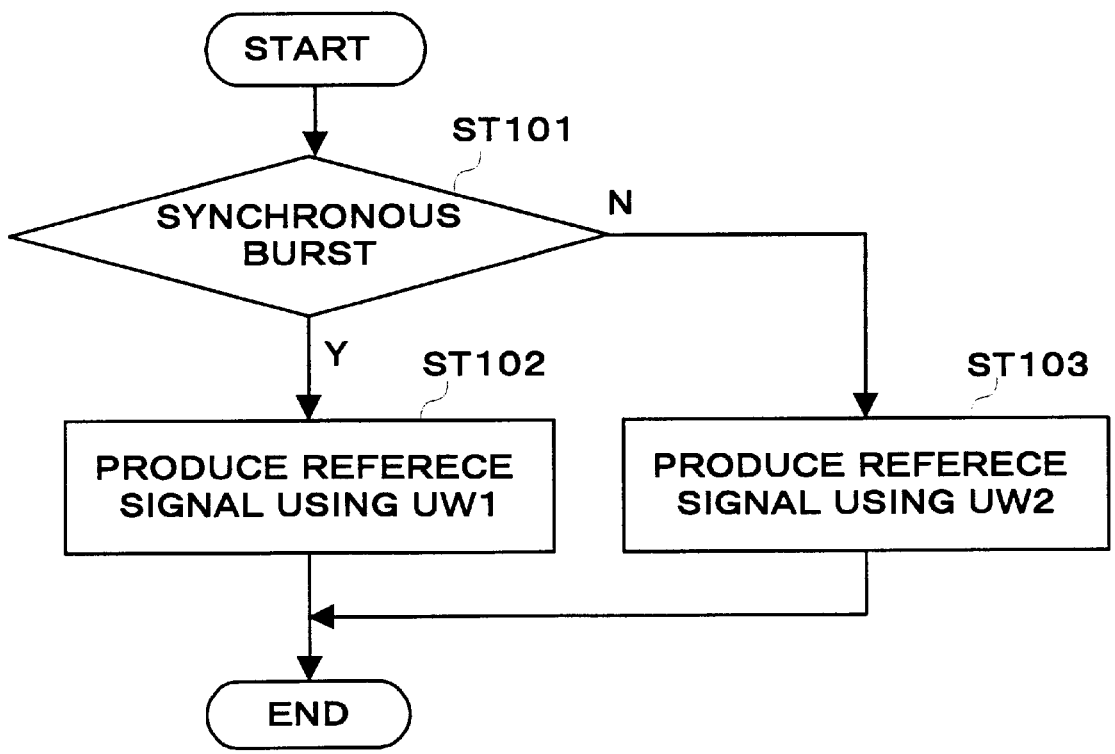
FIG. 4 is a flow chart showing a reference signal selection according to the first embodiment of the present invention.

In the first embodiment, an explanation gives the structure in which the unique word using as a reference signal is switched. An operation of this case is shown in FIG. 4. More specifically, it is determined each time whether or not the receiving signal is the synchronous burst (ST101). When th receiving signal is the synchronous burst, th unique word (UW1) in the synchronous burst is used as a reference signal (ST102). When the receiving signal is not the synchronous burst, the unique word (UW2) in the communication channel signal is used as a reference signal (ST103). Thus, the switching device 115 is controlled. A modulation signal either one of the unique words is input to the correlation devices 117, 118, and 119.

The correlation devices 117, 118, and 119 process the correlation between the signal modulated again and each of digital signals S1, S2, and S3, which are the outputs of the A/D converters 110, 111, and 112.

It is assumed that desired signals are $D_1$, $D_2$, and $D_3$, interfering signals are $U_1$, $U_2$, and $U_3$, gains of AGC circuits 107, 108, and 109 are , , and , and an output signal of a modulator 161 is D'. The outputs of the correlation devices 117, 118, and 115 can be obtained from the following equations, respectively:

$$\#\text{Antenna 1: } (D_1+U_1)\cdot D'^* = D_1 \cdot D'^* \quad (\text{Eq.1})$$

$$\#\text{Antenna 2: } (D_2+U_2)\cdot D'^* = D_2 \cdot D'^* \quad (\text{Eq.2})$$

$$\#\text{Antenna 3: } (D_3+U_3)\cdot D'^* = D_3 \cdot D'^* \quad (\text{Eq.3})$$

(where * denotes a complex conjugate). Here, the reason why the terms of interfering signals U of (Eq.1) to (Eq.3) disappear can be explain as follows:

Specifically, in the first embodiment, the unique word signal pattern of the signal (desired signal) from the desired station and that of t signal (interfering signal) from the interference station are different from each other. Then, if the receiving signal and the interfering signal are correlated using the unique word signal of the desired signal, the correlation becomes substantially close to zero. Therefore, the outputs of the correlation devices 117, 118, and 119 become receiving power of the desired signal.

Next, standardizing devices 120, 121, and 122 standardize the outputs of the correlation devices 117, 118, and 119 obtained by equations 1 to 3 with control values C1, C2, C3 of the AGC circuits 107, 108, and 109. Thereby, a receiving level estimation 10 value of an actual desired wave is obtained. In other word, the standardizing process here is one for normalizing the outputs of the correlation devices 117, 118, and 119 as considering the gain of the AGC circuits 107 and. 108, and 109. More specifically, if the outputs of the standardizing devices 120, 121, and 122 are $N_1$, $N_2$, and $N_3$, these outputs can be obtained from the following equations 4 to 6, respectively:

$$\#\text{Antenna 1: } N_1 = D_1 \cdot D'^*/ = D_1 \cdot D'^* \quad (\text{Eq.4})$$

Antenna 2: $N_2=D_2 \cdot D'^*/=D_2 \cdot D'^*$ (Eq.5)

Antenna 3: $N_3=D_3 \cdot D'^*/=D_3 \cdot D'^*$ (Eq.6)

A comparator 123 compares the receiving levels of these outputs, and selects a transmission antenna, which has the maximum receiving level estimate value of the desired wave among the outputs $N_1$, $N_2$, and $N_3$ of the standardizing devices 120, 121, and 122, and which is suitable for combating with interfering signal. Then, the comparator 123 outputs the selection result to a switching device 124.

A modulator 126 modulates a transmitting message input from a terminal 125. Then, the modulated transmitting message is converted to a carrier frequency signal by a transmitting RF section 127. The switching device 124 switches the reference signal so as to transmit the carrier frequency signal from any one of the selected transmitting antennas 1, 2, and 3 in accordance with the output of the comparator 123. The carrier frequency signal is transmitted through receiving/transmitting separators 101, 102, and 103.

Thus, both the unique word in the synchronous burst, which is the known symbol and the unique word in the communication channel signal are used as reference signals. These signals are appropriately switched in accordance with the receiving signal and the correlation with the receiving signal of each antenna is processed, so that desired sign power of each antenna can be estimated. Then, the antenna having the maximum correlation value selected, thereby a suitable transmission diversity effect can be obtained even if the interference station exists.

Figure 5:
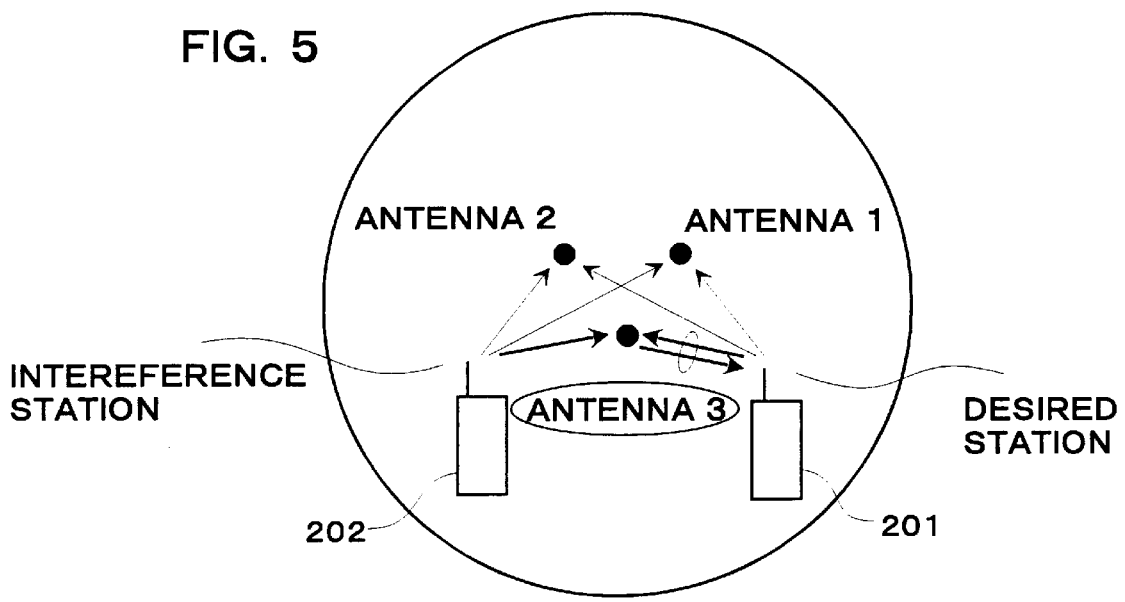
FIG. 5 is a view explaining a method of selecting a transmission antenna according to the first embodiment of the present invention.
Figure 6:
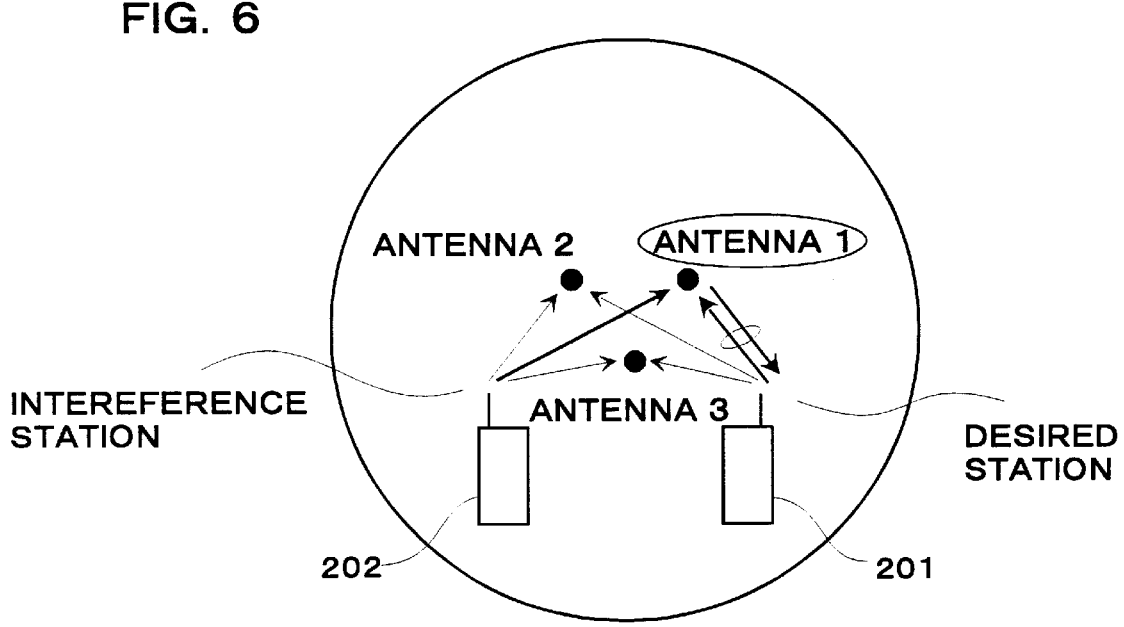
FIG. 6 is a view explaining a method of selecting a transmission antenna according to the first embodiment of the present invention.

Therefore, when the above-mentioned reference signal changing control is not performed, the antenna 3 is selected as a suitable antenna by the of field strength of the receiving signals from a desired station 201 and an interference station 202 as shown in FIG. 5. When the reference signal changing control is performed, the antenna 1 having the maximum desired signal power among the receiving signals of the desired station 201 and the interference station 202 is selected as a suitable antenna.

(Second Embodiment)

Figure 7:
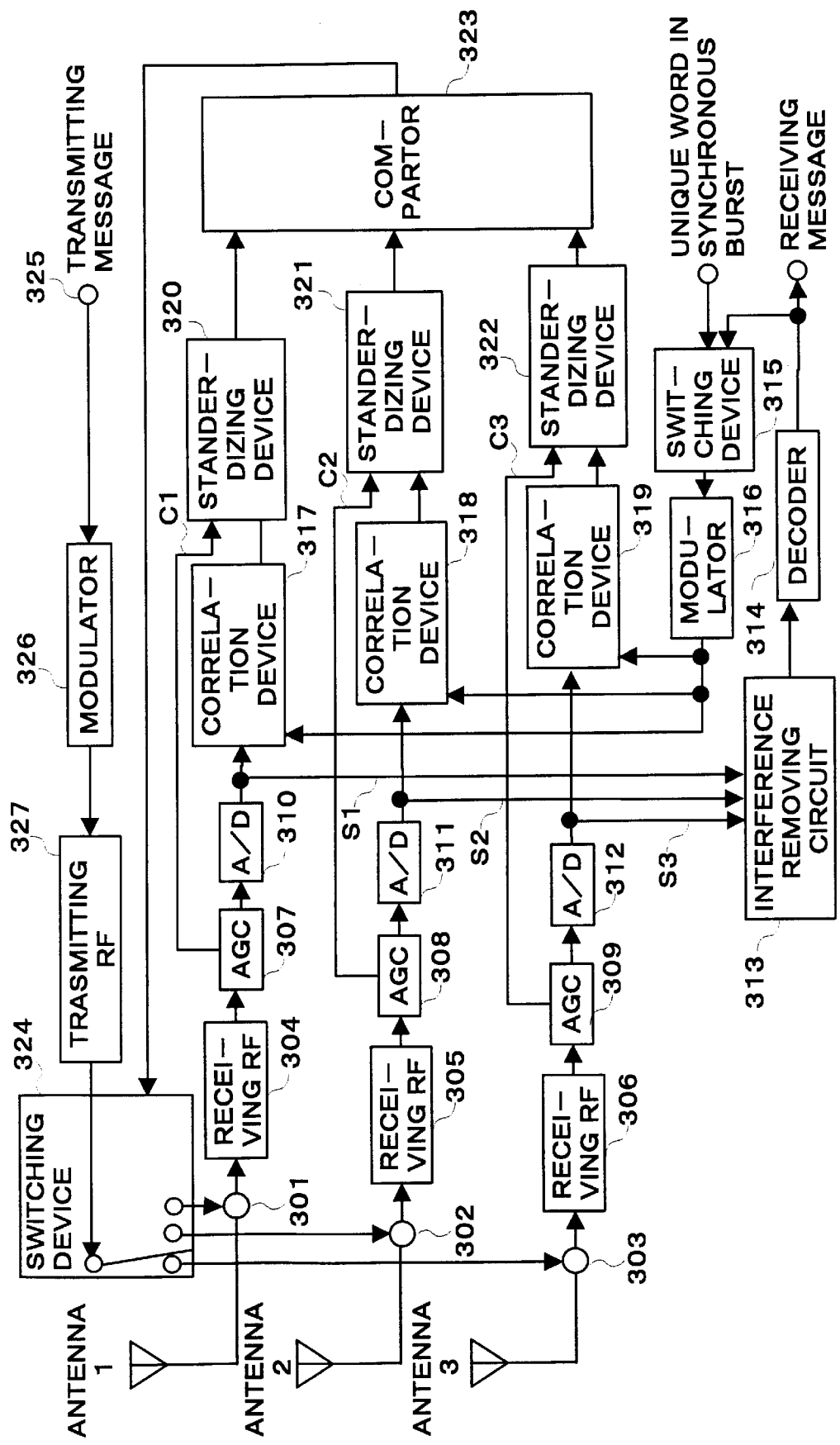
FIG. 7 is block diagram of a second embodiment according to a diversity apparatus of the present invention.

FIG. 7 is a block diagram showing the other structure of the transmission diversity apparatus of the present invention. In the first embodiment, the unique word, which was the known symbol, was used as a reference signal, and the correlation between the receiving signal of each antenna and th reference signal was processed, thereby estimating desired signal power of each antenna. Then, the antenna having the highest correlation value was selected, and the transmitting diversity effect could be obtained even in a case where the interference station existed.

However, in a PHS system in which the unique word is used in common in the desired station and the interference station and these stations cannot be discriminated, a correct reception cannot be sometimes performed because of the change in a propagation environment and the movement of the desired station. In order to solve such a problem, in the second embodiment, the unique word (UW1) in the synchronous burst and the message portion (ME2) in the communication channel are switched to each other so as to produce the reference signal.

First, signals are received from antenna #1, #2, and #3. The received signals are separated by receiving/transmitting separators 301, 302, and 303 of the respective antennas, and sent to the receiving RF sections 304, 305, and 306. The carrier frequency signals are converted to the base band signals by the receiving RF sections 304, 305, and 306. Further, power levels of the respective base band signals are controlled by AGC circuits 307 308, and 309, and A/D converters 310, 311, and 312 convert these base band signals to digital. signals The digital signals S1, S2, and S3 are received b an interference removing circuit 313 having a receiving diversity function, and decoded by a decode 314. Thereby, a receiving message can be obtained.

On the other hand, a switching device 3 changes the unique word in the synchronous burst, which is the known symbol, as a reference signal a the receiving message. The unique word and the receiving message are modulated again by a modulator 316, and input to correlation devices 317, 318, and 319.

The correlation devices 317, 318, and process the correlation between the signals modulated again and the digital signals S1, S2, and S3, which are the outputs of the A/D converters 310, 311, 312. Standardizing devices 320, 321, and 322 standardize the outputs of the correlation devices 317, 318, and 319 with control values C1, C2, and C3 of the AGC circuits 307, 308, and 309. Thereby, receiving level estimation values of actual desired waves can be obtained. A comparator 323 compares the receiving level estimation values, and selects a transmitting antenna, which has the maximum receiving level estimation value of the desired wave, and which is suitable for combating with the interfering signal. Then, the comparator 323 outputs the selection result to a switching device 324.

On the other hand, a modulator 326 modulate a transmitting message input from a terminal 325. Then, the modulated transmitting message is converted to a carrier frequency signal by a transmitting RF section 327. The switching device 324 switches the reference signal so as to transmit the carrier frequency signal from any one of the selected transmitting antennas 1, 2, and 3 accordance with the output of the comparator 3 The carrier frequency signal is transmitted through receiving/transmitting separators 301, 302, 303.

The above-explained process is basically same as the first embodiment. However, in the second embodiment, a switching device 615 switches the unique word (UW1) in the synchronous burst and the message portion (ME2) in the communication channel signal. Thereby, the reference signals of the correlation devices 317, 318, and 319 are produced.

Figure 8:
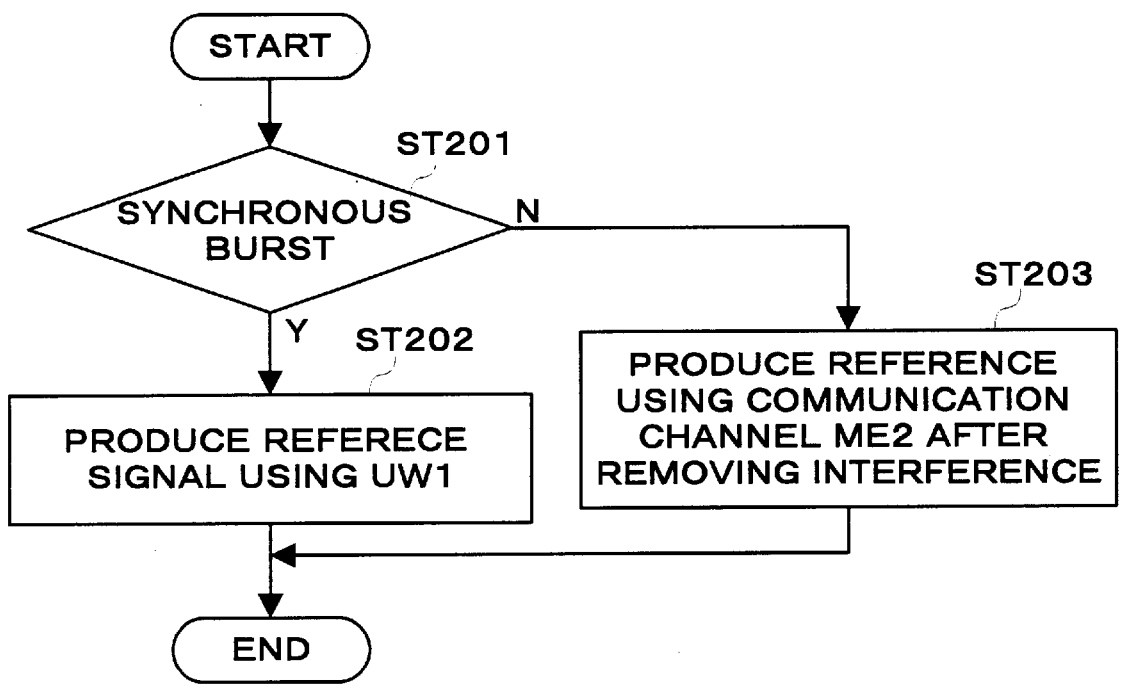
FIG. 8 is a flow chart showing a reference signal selection according to the second embodiment of the present invention.

FIG. 8 is the flow chart. More specifically, it is determined each time whether or not the receiving signal is the synchronous burst (ST201). When the receiving signal is the synchronous burst, the unique word (UW1) in the synchronous burst is used as a reference signal (ST202). When the receiving signal is not the synchronous burst, the message portion (UW2) in the communication channel signal is used as a reference signal (ST203). Thus, the switching device 315 is controlled. A modulation signal of either one of unique words is input to the correlation devices 317, 318, and 319

By the use of the reference signal selected as mentioned manner, the transmitting message can be transmitted from the antenna having the maximum desired signal power at the time of receiving the synchronous burst and at the time of receiving the communication channel.

Figure 9A:
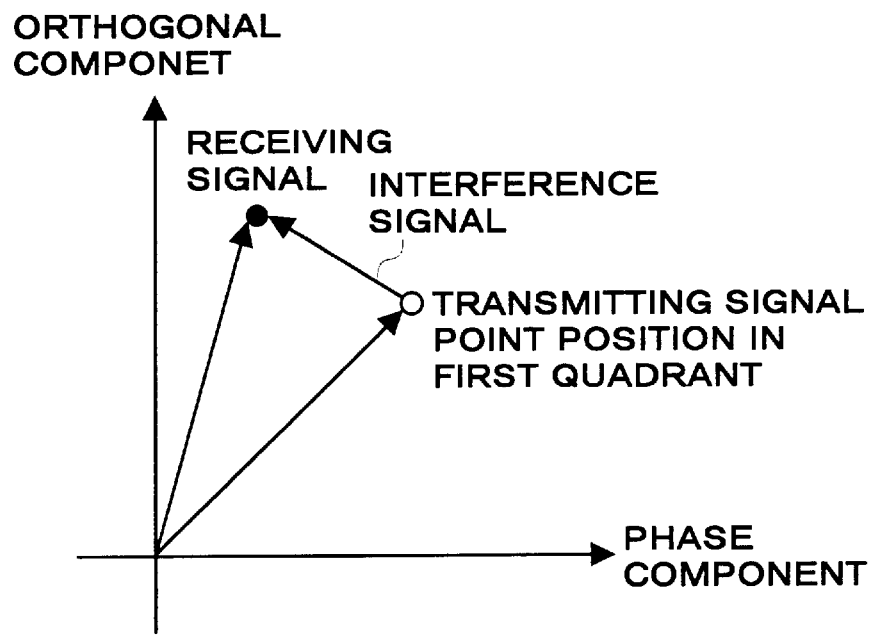
FIGS. 9A and 9B are views explaining a determination of a signal point position according to the second embodiment of the present invention.
Figure 9B:
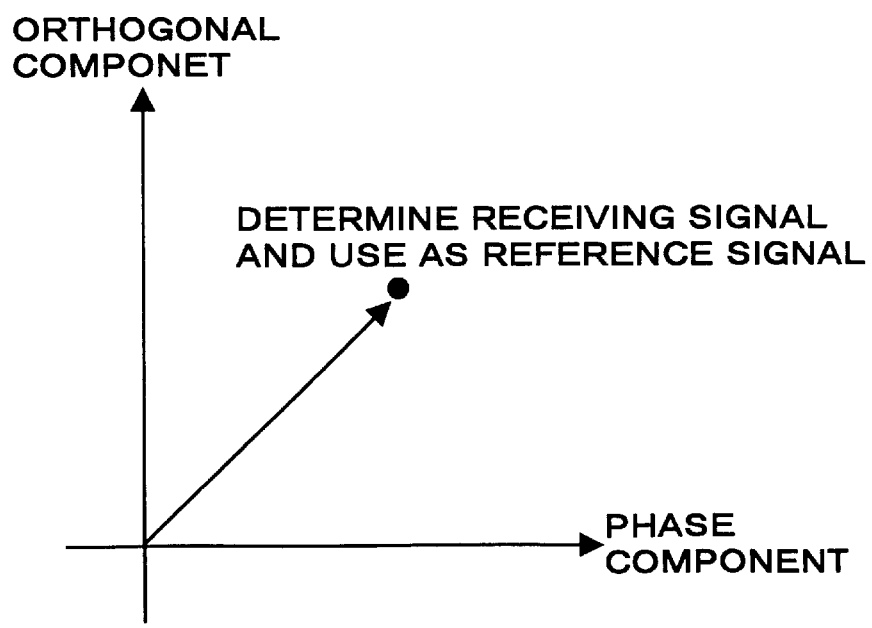

Since the message portion of the receiving signal is not generally the known symbol sequence the message portion cannot be used as a reference signal. However, when an error rate of the message portion is about $10^{-2}$, the number of errors in one slot is small. For this reason, as shown in FIG. 9A, even if the interfering signal is added to the desired signal, the number of signals, which exceed a quadrant to the extent that the determination error occurs, is small. In other words, if the signal point position is known instead of the known symbol sequence, the received signal to which the interfering signal of the message portion is added as shown in FIG. 9B is redetermined as being placed at the original signal point position for each quadrant. Thereby, the interfering signal of the message portion can be removed. The symbol deter mined in this way is considered to be substantially correct, and is used as a reference signal.

Thus, the unique word in the synchronous burst having a different unique word pattern and the message portion signal in the communication channel signal from which the interfering signal is remove are compared with each other by use of the receiving signals from the respective antennas. Thereby, the transmitting antenna, which has the highest correlation with the desired signal and which has the maximum desired signal power, can be selected even in a case in which there is the interference station having the same unique word pattern as the of the desired station. As a result, the transmitting antenna can be correctly selected in accordance with the movement of the desired station and the change in the propagation environment.

Figure 10A:
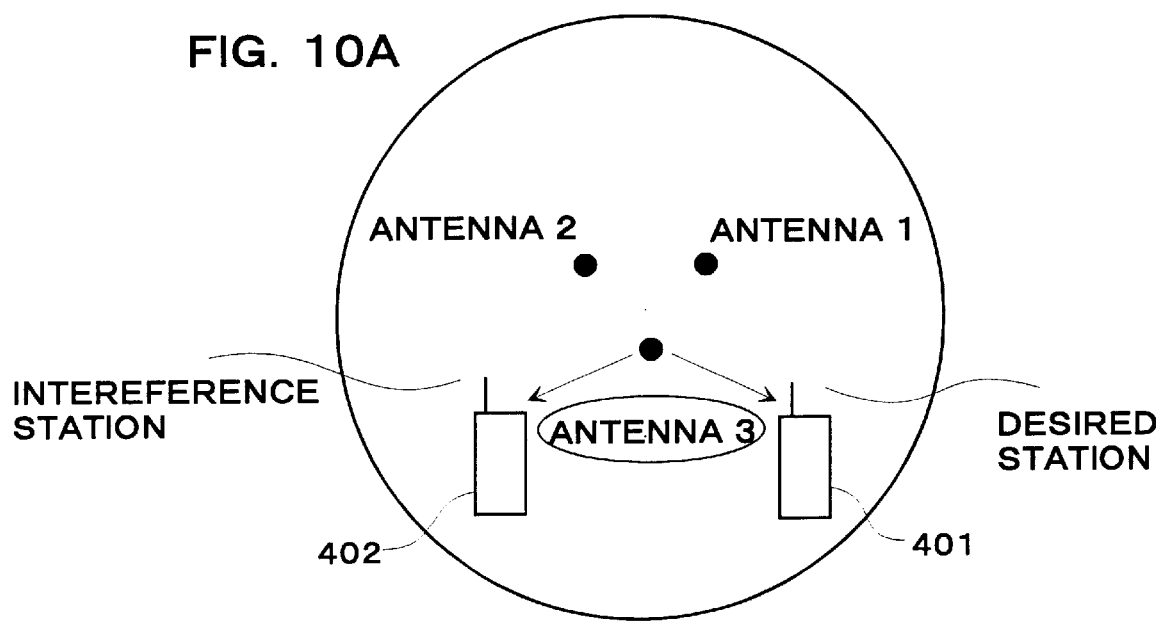
FIG. 10A is a view explaining an interference amount to an interference station provided by transmission of the conventional transmission diversity apparatus.
Figure 10B:
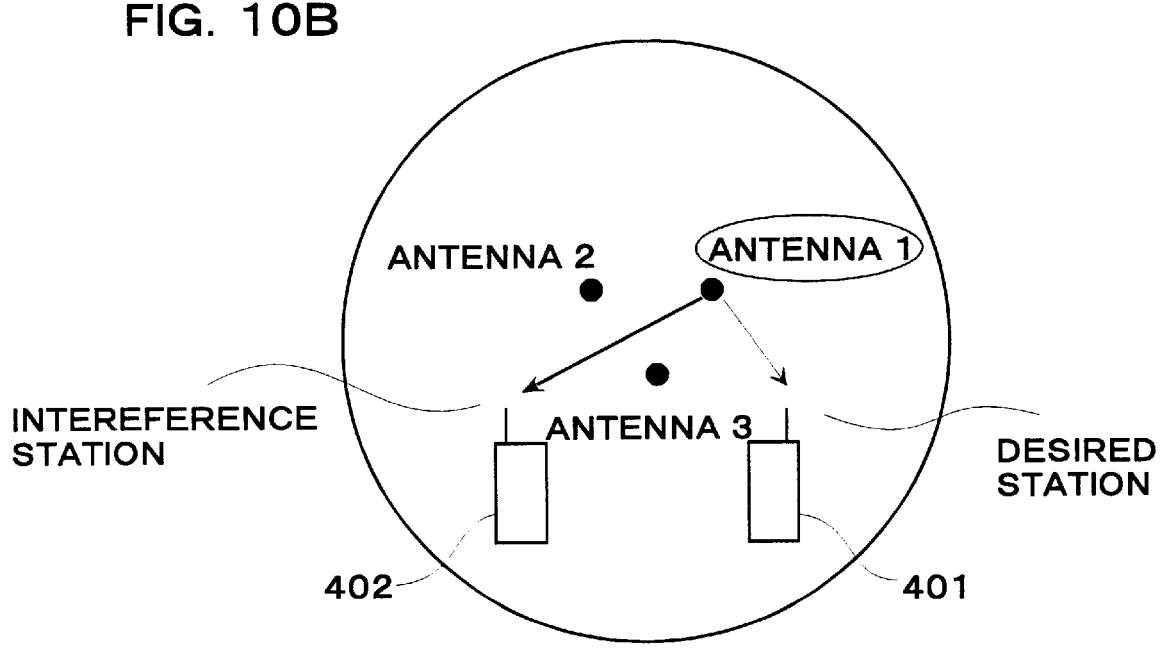
FIG. 10B is a view explaining the interference amount to an interference station provided b transmission of the transmission diversity apparatus of the present invention.

In consideration of using a nondirectional antenna as an antenna for receiving and transmitting, the suitable antenna is conventionally selected by the following method. More specifically, as shown in FIG. 10A, the antenna is selected by the sum of the field strength of the receiving signals from a desired station 401 and an interference station 402. According to this method, however, an antenna (antenna 3), in which the antenna distance between the desired station 401 and the interference station 402 is the shortest, is selected. When the transmission is performed using the selected antenna 3, an interference to the interference station 402 increases, and a call is cut off in the worst case. According to the first and second embodiments of the present invention, however, the antenna 1 having the maximum desired signal power in the receiving signals of the desired station and the interference station 402 is selected as a suitable antenna as shown in FIG. 10B. As a result, the transmission can be performed using the antenna in which the distance between the interference station 402 and the transmitting antenna is long. Therefore, the interference to the interference station 402 is reduced, and the frequency effective use is possible.

Figure 11A:
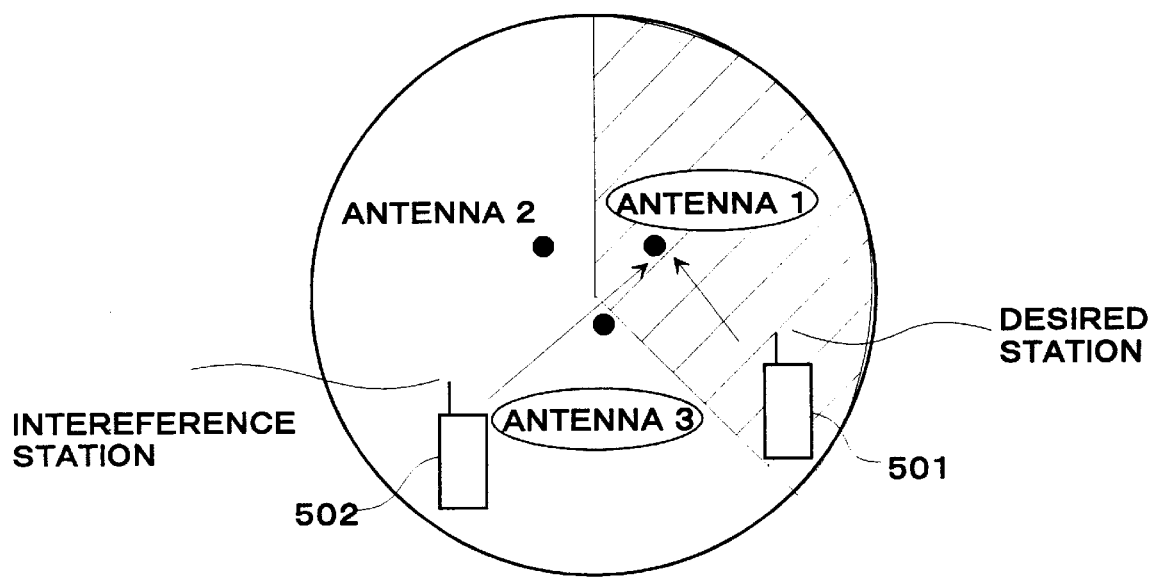
FIG. 11A is a view explaining the interference amount provided by reception of the transmission diversity apparatus of the present invention; an FIG. 11B is a view explaining the interference amount provided by transmission of the transmission diversity apparatus of the present invention.
Figure 11B:
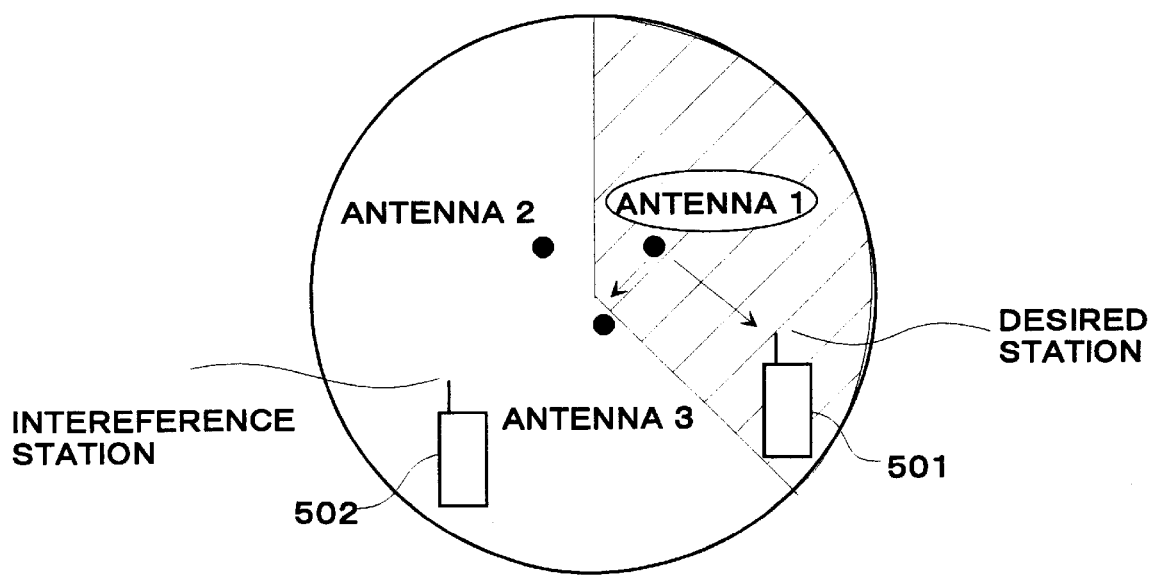

In consideration of using a directional antenna as an antenna for receiving and transmitting, as shown in FIG. 11A, an interference to an interference station 502 can be reduced at the signal reception, and this leads to improvement of the quality of the signal reception. On the other hand, as shown in FIG. 11B, a directional antenna having the maximum desired power of a desired station 501 is selected at the signal transmission As a result, in a case where the interference station 502 is out of the directional range, the interference to the interference station 502 due to transmission can be greatly reduced. In this case, since unnecessary waves are not emitted out of the directional range, the channel capacity, excepting a portion shown by oblique Lines in FIG. 11B, can be improved.

The transmission diversity apparatus can applied to a base station apparatus and a mobile station in a radio wave communication system.

As explained above, according to the present invention, the antenna having the maximum desired signal power is selected, thereby making it possible to obtain the suitable transmission diversity effect using the antenna, which is strongest against the interfering signal even in a case where the interference station exists.

What is claimed is:

1. A transmission diversity apparatus, comprising:
a plurality of antennas, each antenna of said plurality of antennas having a gain controller that controls a receiving signal power;
a correlation processor that processes a correlation between an output of said gain controller and a reference signal; and
a standardizing device that standardizes an output of said correlation processor with a gain control amount of said gain controller, said transmission diversity apparatus selecting an antenna, which can obtain an output having a maximum desired signal power among outputs of said standardizing device, as a transmission antenna, wherein said reference signal; comprises a unique word signal in a synchronous burst and a message signal in a communication channel signal.

2. The transmission diversity apparatus of claim 1, wherein said reference signal comprises a unique word signal in a synchronous burst and a unique word signal in a communication channel signal.

3. The transmission diversity apparatus of claim 1, wherein a unique word signal is used as a reference signal when a unique word signal pattern of a signal from a desired station is different from that of a signal from an interference station.

4. A transmission diversity apparatus, comprising:
a plurality of antennas, each antenna of said plurality of antennas having a gain controller that controls a receiving signal power;
a correlation processor that processes a correlation between an output of said gain controller and a reference signal; and
a standardizing device that standardizes an output of said correlation processor with a gain control amount of said gain controller, said transmission diversity apparatus selecting an antenna, which can obtain an output having a maximum desired signal power among outputs of said standardizing means, as a transmission antenna, wherein a message signal of a receiving signal is used as a reference signal when a unique word signal pattern of a signal from a desired station is the same as that of a signal from an interference station.

5. The transmission diversity of claim 1, wherein a message signal point of the receiving signal is determined as being placed at a signal point position signal of a transmitting signal in the same quadrant, so that a signal component front the interference station is removed.

6. The transmission diversity of claim 1, wherein said plurality of antennas comprise directional antennas.

7. The transmission diversity apparatus of claim 1, wherein said plurality of antennas comprise non-directional antennas.

8. A transmission diversity method, comprising:
processing a correlation between a receiving signal of each of a plurality of antennas and a reference;
selecting an antennas that receives a receiving signal with a highest correlation as a transmitting antenna; and
transmitting a transmitting signal with the selected antenna, wherein the reference comprises a unique word signal in a synchronous burst and a message signal in a communication channel signal.

9. The transmission diversity method of claim 8, wherein the reference comprises a unique word signal in a synchronous burst and a unique word signal in a communication channel signal.

10. The transmission diversity method of 8, wherein a unique word signal is used as a reference signal when a unique word signal pattern in a signal from a desired station differs from a unique word in a signal from an interference station.

11. A transmission diversity method, comprising:

processing a correlation between a receiving signal of each antenna of a plurality of antennas and a reference;

selecting an antenna that receives a receiving signal with a highest correlation as a transmitting antenna; and transmitting a transmitting signal with the selected antenna, wherein a message signal of receiving signal is used as the reference when a unique word signal pattern of a signal from a desired station is the same as that of a signal from an interference station.

12. The transmission diversity method of claim 11, wherein a message signal point of the receiving signal is determined as being placed at a signal point position signal of a transmitting signal in a same quadrant, so that a signal component from the interference station is removed.

13. The transmission diversity method of claim 8 wherein the plurality of antennas are directional antennas.

14. The transmission diversity method of claim 8, wherein the plurality of antennas are nondirectional antennas.

\* \* \* \* \*

UNITED STATES PATENT AND TRADEMARK OFFICE
CERTIFICATE OF CORRECTION

PATENT NO. : 6,226,508 B1
DATED : May 1, 2001
INVENTOR(S) : H. Takahashi et al.

It is certified that error appears in the above-identified patent and that said Letters Patent is hereby corrected as shown below:

Title page,
Item [56], References Cited, OTHER PUBLICATIONS,
Line 1, "No. 5-299990" should be -- No. 5-29990 --.

Column 8,
Line 43, "front" should be -- from --.

Column 9,
Line 7, after "of" insert -- a --.

Signed and Sealed this

Twenty-ninth Day of January, 2002

Attest:

JAMES E. ROGAN
Attesting Officer
Director of the United States Patent and Trademark Office